United States Patent Office 3,345,155
Patented Oct. 3, 1967

3,345,155
ESTABLISHING PERENNIAL GRASS TURF WITH CYCLOALKYL ESTERS OF A CARBANILIC ACID
Raymond W. Luckenbaugh, Wilmington, Del., assignor to E. I. du Pont de Nemours and Company, Wilmington, Del., a corporation of Delaware
No Drawing. Filed June 10, 1966, Ser. No. 556,554
17 Claims. (Cl. 71—111)

ABSTRACT OF THE DISCLOSURE

Establishing perennial grass turf by applying to areas before annual grass weed seeds have developed beyond the three-leaf stage an ester of carbanilic acid such as carbanilic acid, cyclohexyl ester.

---

This application is a continuation-in-part of my applications Ser. No. 306,283 and 306,303 both filed Sept. 3, 1963, 311,634 filed Sept. 26, 1963, 320,921 filed Nov. 1, 1963, 381,579 filed July 9, 1964 and 496,161 filed Oct. 14, 1965 (all now abandoned).

This invention relates to methods of destroying weeds. More specifically, it refers to methods of selectively retarding the growth of annual weed grasses by applying to them a growth retardant amount of a cycloalkyl ester of a carbanilic acid.

I have discovered that by applying carbanilic acid esters to an area in which there is growing crabgrass, foxtail, German millet, barnyardgrass, cheatgrass or Bermudagrass from seed, nimblewill and Johnsongrass from seed there results a marked growth retardation of the seedling grass plants.

A compound of this invention retards the growth of crabgrass and like annual weed grasses by exerting an effect on the grass root system. The root system fails to grow and develop in a normal manner. Broadleaf plants such as Dichondra spp., dichondra and established perennial turf grasses such as *Poa pratensis*, Kentucky bluegrass; Poa spp., other bluegrasses; Agrostis spp., bentgrasses; and Festuca spp., fescues show no injury. Therefore, undesirable annual grasses, such as crabgrass, growing in a lawn treated with a compound used in this invention are soon crowded out by desirable plants or destroyed by lack of an adequate supply of water, oxygen and minerals necessary to sustain life.

It is well recognized by lawn owners that crabgrass is one of the most difficult weeds to eliminate from a lawn. Its branching root system firmly anchors the plant in the soil. Minerals and water needed by lawn grasses are used for the growth of the crabgrass plants and the development of lawn grasses in the immediate area of the crabgrass is slowed. In areas of sparse turf grass the crabgrass crowds out the perennial grasses before they can become established. By applying a compound used in my invention lawn owners can now plant such desirable turf grasses as bluegrass and fescues in the spring without fear that crabgrass will crowd out these turf grasses before they become established.

An additional advantage derived from the use of the active compounds of this invention is that annual grasses are selectively destroyed. This is accomplished because of the low rate of chemical needed to destroy the annual grasses and the absence of harmful effects on desirable plants from compounds used in this invention even at high rates.

Inasmuch as the treated crabgrass growing in a well-watered lawn remains green until the desirable lawn grasses take over, the lawn owner is not plagued with objectionable brown patches which mar the beauty of his lawn. In effect the lawn owner is destroying crabgrass without leaving scars on his lawn. Heretofore known methods of removing crabgrass, such as with pre-emergence or post-emergence crabgrass herbicides and hand picking, have not been able to acomplish this amazing result.

Specifically, the compounds of this invention which have the ability to retard the growth of annual weed grasses are represented by the formula:

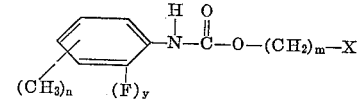

wherein $m$ is 0 or 1;
$n$ is 0 or 1;
$y$ is 0 or 1;
X is monomethyl-, dimethyl-, monohalo-, dihalo-, or monohalomonomethyl-saturated cycloalkyl where each cycloalkyl has 5 through 8 carbon atoms, monomethyl-, dimethyl-, monohalodihalo-, or monohalomonomethyl-saturated bicycloalkyl where each bicyclealkyl has 7 through 8 carbon atoms, saturated cyclohexyl, saturated cyclheptyl, saturated cyclooctyl, saturated bicycloheptyl, saturated bicyclooctyl, monoethyl- or diethyl saturated cyclohexyl, with the limitation that when X is cycloalkyl of 5, 7 or 8 carbon atoms or bicycloalkyl of 7 or 8 carbon atoms, $(CH_3)_n$ must be in the meta position.

The bicycloalkyl or cycloalkyl esters of carbanilic acids of the following formula cause especially marked growth retardation of crabgrass growing in established lawn containing perennial grasses.

Particularly outstanding annual grass retarding effect is achieved with a compound of the formula:

II
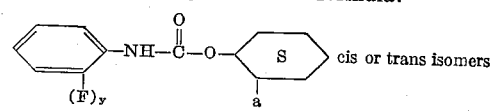
cis or trans isomers wherein $y$ is 0 or 1; and
$a$ is $CH_3$, Cl or Br.

A particularly preferred compound because of its extended persistence in soil is III
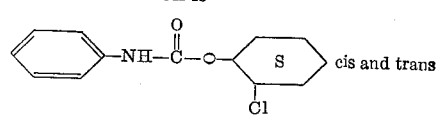
cis and trans A particularly preferred compound because of its post-emergence retardation activity on annual weed foilage is

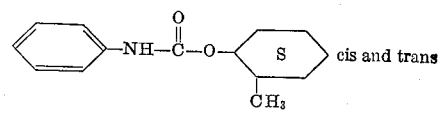
cis and trans

Mixtures of isomers of the compounds used in this invention can be employed in the procedures of this invention. The most economical means of preparing the cycloalkanols, such as 2- or 3-methylcyclohexanol results in a mixture of cis and trans isomers. No separation of the isomers is needed.

For the purposes of this specification and its claims Digitaria spp., crabgrass; Setaria spp. foxtail and German millet; Echinochloa spp., barnyard grass; *Bromus secalinus*, cheatgrass; and related genera as well as *Sorghum halepense*, Johnsongrass and *Cynodon dactylon* Bermudagrass, *Muhlenbergia schreberi*, nimblewill growing from seeds are considered to be annual grass weeds.

COMPOSITIONS

Compositions of this invention are formulated by mixing a compound of this invention together with one or more surface-active agents.

The surface-active agents also known as surfactants which are used in this invention can be wetting, dispersing, or emulsifying agents. They may act as wetting agents for wettable powders and dusts, as dispersing agents for wettable powders and suspensions, and as emulsifying agents for emulsifiable concentrates. Surfactants may also enhance the biological activity of the carbanilic acid esters of this invention. Such surfactants, can include anionic, cationic and non-ionic agents as have heretofore been generally employed in plant control compositions or similar type. Suitable surface-active agents are set out, for example, in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers Annual-1963" by John W. McCutcheon, Inc., and Bulletin E–607 of the Bureau of Entomology and Plant Quarantine of the U.S. Department of Agriculture.

Suitable surface-active agents for use in compositions of this invention include polyethylene glycol esters with fatty acids and rosin acids, polyethylene glycol ethers with alkylated phenols or with long-chain aliphatic alcohols, polyethylene glycol ethers with sorbitan fatty acid esters and polyoxyethylene thioethers. Other suitable surfactants include amine, alkali and alkaline earth salts of alkylaryl sulfonic acids, amine, alkali and alkaline earth salts of fatty alcohol sulfates, dialkyl esters of alkali metal sulfosuccinates, fatty acid esters of amine, alkali and alkaline earth isethionates, and taurates, amine, alkali and alkaline earth salts of lignin sulfonic acids, methylated or hydroxyethylated cellulose, polyvinyl alcohols, amine, alkali and alkaline earth salts of polymerized alkyl naphthalene sulfonic acids, and long-chain quaternary ammonium compounds. Anionic and non-ionic surface-active agents are preferred.

Among preferred wetting agents are sodium alkylnaphthalene sulfonates, sodium dioctylsulfosuccinate, sodium dodecylbenzene sulfonate, ethylene oxide condensates with alkylated phenols such as octyl, nonyl or dodecylphenol, sodium lauryl sulfate, and trimethylnonyl polyethylene glycol. Among preferred dispersing agents are sodium, calcium and magnesium lignin sulfonates, low viscosity methyl cellulose, polymerized sodium alkylnaphthalene sulfonate, sodium N-oleoyl or N-lauryl isethionates, sodium N-methyl - N-oleyl taurate, sodium dodecyldiphenyloxide disulfonate, and polyethylene oxide adducts to mixed fatty and rosin acids.

Among preferred emulsifying agents are ethylene oxide adducts to lauric, oleic, stearic or palmitic acid esters of sorbitol, polyethylene glycol esters with lauric, oleic, stearic, palmitic or rosin acids, oil soluble alkylaryl sulfonates, oil soluble polyoxyethylene ethers with octyl-, nonyl-, and dodecylphenol, polyoxyethylene adducts to long-chain mercaptans and mixtures of these surfactants.

In general, less than 10% by weight of the surface-active agent will be used in compositions of this invention and ordinarily the amount of surface-active agents will range from 1–5% but may even be less than 1% by weight.

Additional surface-active agents can be added to the above formulation to increase the ratio of surface-active agent:active agent up to as high as 5:1 by weight. Normally the purpose of adding higher amounts of sufactant is to increase the growth retardant effect of the active compounds. When used at higher rates it is preferred that the surfactant be present in the range of one-fifth to five parts surfactant for each one part of active agent.

Plant growth retardant compositions of this invention can contain, with or without a surfactant, finely divided inert diluents such as talcs, natural clays including attapulgite clay and kaolinite clay, pyrophyllite, diatomaceous earths, synthetic fine silicas, calcium silicate, carbonates, calcium phosphates, sulfur, lime and such flours as walnut shell, wheat, redwood, soybeans and cottonseed. The amount of the finely divided inert solid diluent can vary widely but will generally range from 10 to 98% by weight of the growth retardant compositions. The particle size can vary considerably but will ordinarily be somewhat under 50 microns in the finished formulation.

Compositions containing such finely divided diluents and one or more of the above-mentioned surfactants can be in the form of wettable powders. Such wettable powders are prepared by mixing the cycloalkyl esters of carbanilic acid, surfactants, diluents and other optional ingredients such as corrosion inhibitors, antifoam agents, pigments, etc. in a blender, followed by grinding to obtain a product of fine particle size, suitable for dilution in water and subsequent application as a finely atomized aqueous spray. Such wettable powders can contain 20 to 90% active ingredient, ½ to 10% of surface-active agents, plus diluents and optional formulative additives. An active ingredient content of 35 to 85% is preferred.

When the composition contains a pulverulent solid and no surfactant, as in dusts or granules, the amount of active ingredient is limited to 0.5% to 10% by weight of the composition.

Compositions containing an active compound and inert solid diluents can also be formulated into granules. In such compositions the diluent will generally range from 65 to 99% by weight and the active ingredient can range from 1 to 35% by weight. It should be understood that it will not be necessary to include a surfactant in the granular composition. To prepare granules the active compound can be dissolved in a solvent and this solution can be sprayed over pre-formed clay granules, expanded vermiculite or the like to distribute the active ingredient over and throughout the granular mass. Such granules can range in particle size of from +60 mesh to +4 mesh. An active ingredient content of 1 to 6% is preferred. It is also possible to make such granules by mixing the finely divided diluent and finely divided active ingredient, for instance by grinding together, and then forming granules by adding water, tumbling and drying the resulting product. In another embodiment the active ingredient can be included in granular fertilizer compositions. In addition to the diluents, grandular compositions can contain additives such as binders, surfactants and the like.

The cycloalkyl esters of carbanilic acids can also be formulated as densified pellets. For such compositions the active ingredient is mixed with a suitable clay or other binders, the mixture is ground and then compacted in a pug mill, screw extruder, briquetting or tabletting machine or the like, and the densified product is broken up into pellets of desired size. If water is added to give the mass suitable plasticity for compaction, as is often desirable when pelleting clays are used and pellets are formed in a screw extruder or pug mill, a drying step is needed. Such compositions may include water soluble salts or surface-active agents to aid the disintegration of pellets and release of active ingredient after application. The active ingredient content of such pellet may range from 5 to 75%, 15–50% being preferred.

In addition to the formulation described above, sand ground formulations can be prepared using the method described in Hochberg U.S. Patent 2,581,414, issued Aug. 19, 1948. Using the methods of described in this patent, fine particles of the active compounds within the scope of this invention will be dispersed evenly in a diluent.

Emulsifiable oil solutions can also be employed with one or more of the cycloalkyl esters of carbanilic acids used in this invention. In these plant growth regulant compositions, the surface-active agent and an oil form a liquid which can be conveniently poured and measured. Such solutions can be mixed with water at the point of application to form an emulsion containing the herbicides and the surface-active agent. Such compositions have the advantage that the oil will often act as a foam inhibitor and thus reduce the tendency for large amount of surfactants to form objectionable foam. The oil used, such as toluene, kerosene, Stoddard solvent, xylene, alkylated naphthalenes, diesel oil, isophorone and the like should be preferably water immiscible and be of a type in which the active agent will be soluble in the amounts used in particular formulations.

In the emulsifiable oil concentrations, the cyclo-alkyl carbonilic acid ester will be present in amounts ranging from 10 to 35% by weight. Precise concentrations of active agent, of course, will depend on the intended use of the composition. When mixed with water at the point of application, the oil concentration will be diluted so that in the final formulation the active agent will be present in amounts ranging from about 0.5% to 2% by weight.

It is, of course, also possible to use such oil solutions of cycloalkyl esters of carbanilic acids by extending them with other oils, for example, diesel oil, herbicidal oil and the like.

APPLICATION

Compounds of this invention are applied directly to the soil in pre-emergence or post-emergence treatment to foliage or they can be mixed intimately with the soil. Rates of application can be in the range of ½ to 20 pounds per acre and preferably will be used at the rate of 1 to 15 pounds per acre. Rates as high as 20 pounds have been used on tests on established turf grasses without undesirable injury.

Cyclohexanol ester of carbanilic acid can be applied directly to the soil as a pre-emergence treatment or it can be mixed intimately with the soil. The rate of application will be in the range of two to twenty-four pounds per acre.

Rates of 1 to 6 pounds per acre inhibit the growth of nimblewill plants germinating from seed. Rates of 40 to 60 pounds per acre inhibit the growth of nimblewill plants which have established rhizomes.

As an application on established growing lawns before crabgrass appears, growth of the undesirable crabgrass is retarded with 2 to 10 pounds of active ingredient per acre. There is no injury to established Kentucky bluegrass, bentgrasses or fescues. Crabgrass makes an appearance above the soil and then fails to develop.

As an application on lawn areas either before or after seeding lawn grasses such as bluegrass, bentgrass or fescue and before the lawn grasses and crabgrass have emerged, 2 to 8 pounds of active ingredient per acre prevents the development of crabgrass. There is no undesirable effect on the development of the lawn grasses.

As an application of newly-seeded lawns after such lawn grasses as bluegrass, bentgrass, fescues and crabgrass have appeared 2 to 8 pounds of active ingredient will prevent the further development of crabgrass. There is no preceptible injury to the desirable lawn grasses.

As an application on established lawns after the crabgrass appears at emergence to the 3-leaf stage, 3 to 16 pounds per acre of the active ingredient will prevent the further development of crabgrass without injury to the established grasses.

The compounds of this invention can also be applied admixed or in common solution with other chemicals which are used in agronomic and horticultural management and are compatible with the compounds of this invention. Such chemicals may be, but are not restricted to, the classes of chemicals commonly known as plant nutrients, fertilizers, insecticides, fungicides, herbicides and nematocides. Typical of the insecticides that can be used are:

1,2,3,4,10,10-hexachloro-6,7-epoxy-1,4,4a,5,6,7,8,8a-octahydro-1,4,5,8-dimethanonaphthalene (Dieldrin),
1,2,4,5,6,7,8,8-octachloro-4,7-methano-3a,4,7,7a-tetrahydroindane (Chlordane),
1,1,1-trichloro-2,2-bis(p-methoxyphenyl)ethane (Methoxychlor),
1,1,1-trichloro-2,2-bis(p-chlorophenyl)ethane (DDT) and
1-naphthyl-N-methylcarbamate ("Sevin").

Based on the weight of the carbanilic acid ester, 0.02 to 10 parts by weight of insecticide will be present.

Fungicides that can be used in conjunction with the compounds of this invention include one or more of the following:

p-dimethylaminobenzenediazo sodium sulfonate;
quinone oxyaminobenzooxohydrazone;
tetraalkyl thiuramsulfides such as tetramethyl thiuram monosulfide or disulfide and tetraethyl thiuram monosulfide or disulfide;
metal salts of ethylene bisdithiocarbamic acid, e.g. manganese, zinc, iron and sodium salts;
pentachloronitrobenzene;
dodecylguanidine acetate;
N-trichloromethylthio tetrahydrophthalimide (captan);
phenylmercury acetate;
2,4-dichloro-6-(o-chloroanilino)-s-triazine;
N-methylmercury p-toluenesulfonanilide;
chlorophenol mercury hydroxides;
nitrophenol mercury hydroxides;
ethyl mercury acetate;
ethyl mercury 2,3-dihydroxypropyl mercaptide;
methyl mercury acetate;
methyl mercury 2,3-dihydroxypropyl mercaptide;
1,4-dichloro-2,5-dimethoxybenzene;
3,3'-ethylene-bis(tetrahydro-4,6-dimethyl-2H-1,3,5-thiadiazine-2-thione);
methyl mercury dicyandiamide;
N-ethyl mercury p-toluenesulfonanilide;
metal (e.g. iron, sodium and zinc), ammonium and amine salts of dialkyldithiocarbamic acids;
tetrachloronitroanisole;
hexachlorobenzene;
methyl mercury nitrile;
tetrachloroquinone; and
N-trichloromethylthiophthalimide.

Generally, one can use 0.02 to 10 parts of fungicide by weight based on the carbanilic acid ester.

The control of crabgrass with these cycloalkyl esters of carbanilic acids often can be advantageously accomplished together with the use of conventional herbicides in situations where crabgrass is growing with weeds controlled by the second herbicide.

Illustrative of herbicides that can be used in conjunction with the compounds of this invention in sprays and granular formulations to take weeds out of other desirable plants are the following:

| Lbs./acre | Herbicide | Desirable Plants |
| --- | --- | --- |
| 1-3 | 2,4-dichlorophenoxyacetic acid | Roadside turf grasses. |
| 0.3-1 | 2,4,5-trichlorophenoxyacetic acid | Do. |
| 0.5-1.5 | 2,4,5-trichlorophenoxypropionic acid. | Do. |
| 1-4 | 1-n-butyl-3-(3-4-dichlorophenyl)-1-methylurea. | Ornamentals and lawn turf grasses. |
| 1-4 | 1,2-dihydropyridazine-3,6-dione | Roadside turf grasses. |

Granular compositions of the invention can also include mixtures of the active ingredient on or in fertilizer granules such as are conventionally used for dry application to lawns, golf courses, fairways, greens and the like. In such compositions the active ingredient content can range from 0.5 to 10% by weight and can be applied to the surface of previously granulated fertilizer or distributed throughout the fertilizer mass prior to granulation. As an example, a conventional 20:10:10 turf food on vermiculite can be treated with a spray containing a solution of the retardant at a rate to give 4% to 8% by weight of active ingredient in the finished product. This yields a composition applicable in standard lawn spreaders at a rate, for example, of 25 pounds per 5,000 square feet to provide a simultaneous fertilization and long term crabgrass control.

It is understood that the compounds and compositions of this invention are applied to the "locus" of the grass growth. By "locus" is meant the plant itself when visible above the ground or the immediate area of soil where the grass plant itself is developing.

The following additional examples, in which all percents unless otherwise specified are by weight, are provided to more clearly explain this invention.

*Example 1*

A solution of 22.4 parts by weight of 2-methylcyclohexanol in 150 ml. of toluene with 0.1 part of triethylenediamine is treated with 23.8 parts by weight of phenylisocyanate for 12 minutes. After standing overnight traces of 1,3-diphenylurea by product are filtered from the mixture and the filtrate is diluted with n-pentane to precipitate the desired product. The product obtained is 40 parts by weight of pure carbanilic acid, 2-methylcyclohexyl ester, M.P. 105–106.5° C.

*Example 2*

The following wettable powder is suitable for any of the compounds described which melt above 90° C.

|  | Percent |
|---|---|
| Carbanilic acid, 2-methylcyclohexyl ester | 50 |
| Diatomaceous silica | 48 |
| Coconut acid ester of sodium isethionate | 1 |
| Sodium lauryl sulfate | 1 |

The ingredients are blended and micropulverized to pass a 60-mesh screen.

This wettable powder formulation in the amount of four pounds of active ingredient is added to 80 gallons of water in a spray tank. A surfactant such as trimethyl nonyl ether of polyethylene glycol with ethylene oxide, is added to this mixture at the rate of six pounds. This tank spray mixture is applied to one acre of Kentucky 31 fescue lawn which is infested with crabgrass in the one to two leaf stage. Excellent retardation of crabgrass is obtained. It turns dark green, shows very slow growth, and the root system fails to develop normally. The crabgrass offers poor competition and is crowded out by the Kentucky 31 fescue. The fescue shows a slightly reduced rate of growth without injury.

*Example 3*

A formulation example for carbanilic acid, 3-methylcyclohexyl ester follows:

|  | Percent |
|---|---|
| Carbanilic acid, 3-methylcyclohexyl ester | 25.00 |
| Hydrated attapulgite | 1.75 |
| Na₂HPO₄ | 0.80 |
| Sodium pentachlorophenate | 0.60 |
| Sodium lignin sulfonate | 15.00 |
| Water | 56.85 |

The above composition is mixed with an equal volume of Ottawa sand of 20–30 mesh and sandmilled for 45 minutes to yield a stable aqueous suspension which may be diluted with water for spray application.

This formulation has utility for the regulation of crabgrass growth in an established Kentucky 31 fescue lawn. A rate of three to four pounds of active ingredient per acre gives excellent retardation of crabgrass when treated in the two leaf stage.

Incidentally, when reference is made to an established lawn this means in accordance with conventional terminology turf lawns which normally contain substantially mature perennial grasses. The lawn grasses may or may not cover all the soil area.

*Examples 4–9*

The following compounds are substituted one at a time for the carbanilic acid, 3-methylcyclohexyl ester in Example 3 in like amount by weight and are formulated and applied in like manner. Like results are obtained.

Ex.
4. carbanilic acid, 3,4-dimethylcyclopentyl ester
5. carbanilic acid, 2,4-dimethylcycloheptyl ester
6. carbanilic acid, 4-methylcyclooctyl ester
7. carbanilic acid, 2-methylcyclopentyl ester
8. carbanilic acid, 2-(5,6 - dimethylnorbornyl)methyl ester
9. carbanilic acid, 2-norbornylmethyl ester

*Example 10*

The following wettable powder is applicable to the low melting solids described in the examples as well as all the high melting solid compounds of this invention.

|  | Percent |
|---|---|
| Carbanilic acid, cycloheptyl ester | 25.00 |
| Alkyl naphthalene sulfonic acid, Na salt | 1.00 |
| Low viscosity methyl cellulose | 0.25 |
| Attapulgite clay | 73.75 |

The above components are blended and micro-pulverized until homogeneous and then reblended.

The formulation described above is applied early post-emergence at the rate of six pounds active ingredient per acre in 80 gallons of water for the control of growth of crabgrass in an established bluegrass-fescue lawn. Excellent retardation of crabgrass is obtained without noticeable damage to the desirable turf grasses.

*Example 11*

The following wettable powder formulation is prepared:

|  | Percent |
|---|---|
| Carbanilic acid, 2-methylcyclohexyl ester | 52.6 |
| Pikes Peak clay | 44.4 |
| Sodium dioctyl sulfosuccinate | 1.5 |
| Sodium lignin sulfonate | 1.5 |

The above components are blended and micro-pulverized until homogeneous and then reblended.

*Examples 12–103*

The following compounds are substituted one at a time for the carbanilic acid, 2-methylcyclohexyl ester of Example 11 in like amount by weight and are formulated in like manner. These compounds when applied at the rate of 15 pounds per acre in 60 gallons of water give excellent growth retardation of crabgrass from emergence to 2-leaf stage growing along a walkway.

Ex.
12. carbanilic acid, trans,cis-2-methylcyclopentyl ester
13. carbanilic acid, trans,cis-3-methylcyclophentyl ester
14. carbanilic acid, trans,cis - 1,2-dimethylcyclopentyl ester
15. carbanilic acid, 2,2-dimethylcyclopentyl ester
16. carbanilic acid, 3,3-dimethylcyclopentyl ester
17. carbanilic acid, 3-methylcyclopentylmethyl ester
18. carbanilic acid, 2-methylcyclopentylmethyl ester
19. carbanilic acid, (cis - 2,3 - dimethylcyclopentylmethyl)ester
20. carbanilic acid, 1-methylcyclohexyl ester
21. carbanilic acid, 2-methylcyclohexyl ester
22. carbanilic acid, 3-methylcyclohexyl ester
23. carbanilic acid, 4-methylcyclohexyl ester
24. carbanilic acid, 1-ethylcyclohexyl ester
25. carbanilic acid, 3,4-dimethylcyclohexyl ester
26. carbanilic acid, 1,3-dimethylcyclohexyl ester
27. carbanilic acid, 2,4-dimethylcyclohexyl ester
28. carbanilic acid, 3,5-dimethylcyclohexyl ester
29. carbanilic acid, 1,4-dimethylcyclohexyl ester
30. carbanilic acid, 2,5-dimethylcyclohexyl ester
31. carbanilic acid, (dl-cis-2-methylcyclohexyl)ester
32. carbanilic acid, (dl - trans - 2 - methylcyclohexyl) ester 33. carbanilic acid, (1-cis-3-methylcyclohexyl)ester
34. carbanilic acid, (dl-cis-3-methylcyclohexyl)ester
35. carbanilic acid, (1 - trans-3-methylcyclohexyl)ester
36. carbanilic acid, cis-2-ethylcyclohexyl ester
37. carbanilic acid, trans-2-ethylcyclohexyl ester
38. carbanilic acid, 2,6-dimethylcyclohexyl ester
39. carbanilic acid, 2,4-dimethylcyclohexyl ester
40. o-fluorocarbanilic acid, (3,5 - dimethylcyclohexyl) ester
41. 3-methylcarbanilic acid, (3,5-dimethylcyclohexyl) ester
42. o-fluorocarbanilic acid, 2-methylcyclohexyl ester
43. o-fluorocarbanilic acid, 3-methylcyclohexyl ester
44. o-fluorocarbanilic acid, 2-chlorocyclohexyl ester
45. o-fluorocarbanilic acid, 2-bromocyclohexyl ester
46. o-fluorocarbanilic acid, cyclohexylmethyl ester
47. o-fluorocarbanilic acid, norbornyl ester
48. o-fluorocarbanilic acid, bicyclooctane ester
49. carbanilic acid, 2,2-dimethylcyclohexyl ester
50. carbanilic acid, 1,2-dimethylcyclohexyl ester
51. carbanilic acid, 4-ethylcyclohexyl ester
52. carbanilic acid, 3,3-dimethylcyclohexyl ester
53. carbanilic acid, cis-2-ethylcyclohexyl ester
54. carbanilic acid, 3-ethylcyclohexyl ester
55. 3-methylcarbanilic acid, cycloheptyl ester
56. 3-methylcarbanilic acid, cyclooctyl ester
57. carbanilic acid, 2,2-dimethylcyclohexyl ester
58. carbanilic acid, 3,3-dimethylcyclohexyl ester
59. carbanilic acid, 4,4-dimethylcyclohexyl ester
60. cabanilic acid, 1,2-diethylcyclohexyl ester
61. carbanilic acid, (2,3 - dimethylcyclohexylmethyl) ester
62. carbanilic acid, (2,6 - dimethylcyclohexylmethyl) ester
63. carbanilic acid, (3,3 - dimethylcyclohexylmethyl) ester
64. carbanilic acid, (2-methylcyclohexylmethyl)ester
65. carbanilic acid, (cis-2 - methylcyclohexylmethyl) ester
66. carbanilic acid, (trans - 2-methylcyclohexylmethyl) ester
67. carbanilic acid, (cis - 3-methylcyclohexylmethyl) ester
68. carbanilic acid, (trans - 3-methylcyclohexylmethyl) ester
69. carbanilic acid, (trans - 4-methylcyclohexylmethyl) ester
70. carbanilic acid, (1-methylcyclohexylmethyl)ester
71. carbanilic acid, (1-ethylcyclohexylmethyl)ester
72. carbanilic acid, cycloheptyl ester
73. carbanilic acid, 2,2-dimethylcycloheptyl ester
74. carbanilic acid, 2-methylcycloheptyl ester
75. carbanilic acid, trans-2,2-dimethylcycloheptyl ester
76. carbanilic acid, cis-2,2-dimethylcycloheptyl ester
77. carbanilic acid, 4-methylcycloheptyl ester
78. carbanilic acid, trans-3-methylcycloheptyl ester
79. carbanilic acid, 4,4-dimethylcycloheptyl ester
80. carbanilic acid, 1-methylcycloheptyl ester
81. carbanilic acid, cyclooctyl ester
82. carbanilic acid, cis-2-methylcyclooctyl ester
83. carbanilic acid, trans-2-methylcyclooctyl ester
84. carbanilic acid, 2,2-dimethylcyclooctyl ester
85. carbanilic acid, 1-methylcycylooctyl ester
86. carbanilic acid, 2-norbornyl ester
87. carbanilic acid, (2-norbornylmethyl)ester
88. carbanilic acid, α-norpinyl ester
89. carbanilic acid, β-norpinyl ester
90. carbanilic acid, trans,cis-1-methylcyclophentyl ester
91. 2-methylcarbanilic acid, 2-methylcyclohexyl ester
92. 4-methylcarbanilic acid, 2-methylcyclohexyl ester
93. 2-methylcarbanilic acid, 3-methylcyclohexyl ester
94. 4-methylcarbanilic acid, 3-methylcyclohexyl ester
95. 2 - methylcarbanilic acid, 3,4 - dimethylcyclohexyl ester
96. 4 - methylcarbanilic acid, 3,4 - dimethylcyclohexyl ester
97. 3-methylcarbanilic acid, 2-methylcyclohexyl ester
98. 3-methylcarbanilic acid, 2-methylcyclohexyl ester
99. 3-methylcarbanilic acid, 1-methylcyclopentyl ester
100. 3 - methylcarbanilic acid, 2,2 - dimethylcyclohexyl ester
101. 3-methylcarbanilic acid, norbornyl ester
102. 3-methylcarbanilic acid, methylnorbornyl ester
103. 3 - methylcarbanilic acid, methyl(2 - methylnorbornyl)ester

Example 104

A solution of 19.6 parts by weight of aniline in 200 parts of ether is treated with 19.7 parts by weight of 2-chlorocyclohexyl chloroformate. The temperature is maintained below 30° with external cooling. The precipitate of aniline hydrochloride is filtered and the filtrate is evaporated in vacuo on a steam bath. The residual oil crystallizes on pouring into an excess of n-pentane. The product is filtered, washed with pentane and dried to yield 23 parts by weight of the carbanilic acid, 2-chlorocyclohexyl ester, M.P. 97–99° C.

Example 105

The following granular formulation can be used. A wettable powder is first prepared by micropulverizing the following ingredients:

| | Percent |
|---|---|
| Carbanilic acid, 2-chlorocyclohexyl ester | 50 |
| Attapulgite clay | 48 |
| Dioctyl sodium sulfosuccinate | 1 |
| Sodium lignin sulfonate | 1 |

The wettable powder is distributed over the surface of #4 vermiculite by tumbling together. To make the combination more adherent the mix is sprayed with a mixture of ethylene glycol and water. The final ratio of ingredients is as follows:

| | Percent |
|---|---|
| 50% active wettable powder | 4 |
| #4 vermiculite | 86 |
| Ethylene glycol | 5 |
| Water | 5 |

In a modification of the above formulation the ethylene glycol can be replaced by a mixture of the sodium sulfates of mixed long chain alcohol fatty acid esters and diethylene glycol abietate in a ratio between 1:10 and 10:1 by weight.

The granular formulation described above has utility as a pre-emergence treatment for retarding the growth of crabgrass in an established Kentucky bluegrass-creeping red fescue lawn. The material is applied with a granule spreader at the rate of six pounds of active ingredient per acre prior to the germination of crabgrass. Such excellent retardation of crabgrass is obtained that it presents no competition to the established lawn.

Examples 106–108

The following compounds are substituted one at a time for the carbanilic acid, 2-chlorocyclohexyl ester in Example 105 in like amount by weight and are formulated and applied in like manner. Like results are obtained.

Ex.
106. 3-methylcarbanilic acid, 2-chlorocyclohexyl ester
107. carbanilic acid, 2-bromocyclohexyl ester
108. carbanilic acid, 2-bromocyclopentyl ester

Example 109

The following wettable powder is suitable for any of the compounds described which melt above 90° C.

| | Percent |
|---|---|
| Carbanilic acid, 2-chlorocyclohexyl ester | 50 |
| Diatomaceous silica | 48 |
| Coconut acid ester of sodium isethionate | 1 |
| Sodium lauryl sulfate | 1 |

The ingredients are blended and micropulverized to pass a 60-mesh screen.

This wettable powder formulation in the amount of four pounds of active ingredient is added to 80 gallons of water in a spray tank. A surfactant such as trimethyl nonyl polyethylene glycol ether is added to this mixture at the rate of six pounds. This tank spray mixture is applied to one acre of Kentucky 31 fescue lawn which is infested with crabgrass in the one to two leaf stage. Excellent retardation of crabgrass is obtained. It turns dark green, shows very slow growth, and the root system fails to develop normally. The crabgrass offers poor competition and is crowded out by the Kentucky 31 fescue. The fescue shows a reduced rate of growth without injury.

*Examples 110–111*

The following compounds are substituted one at a time for the carbanilic acid, 2-chlorocyclohexyl ester of Example 109 in like amount by weight and are formulated and applied in like manner. Like results are obtained.

Ex.
110. carbanilic acid, 2-bromocyclohexyl ester
111. carbanilic acid, 2,2-dichlorocyclohexyl ester

*Example 112*

A formulation example for carbanilic acid, 5-chloronorbornyl ester follows:

| | Percent |
|---|---|
| Carbanilic acid, 5-chloronorbornyl ester | 25.00 |
| Hydrated attapulgite | 1.75 |
| Na$_2$HPO$_4$ | 0.80 |
| Sodium pentachlorophenate | 0.60 |
| Sodium lignin sulfonate | 15.00 |
| Water | 56.85 |

The above composition is mixed with an equal volume of Ottawa sand of 20–30 mesh and sandmilled for 45 minutes to yield a stable aqueous suspension which may be diluted with water for spray application.

This formulation has utility for the regulation of crabgrass growth in an established Kentucky 31 fescue lawn. A rate of three to four pounds of active ingredient per acre gives excellent retardation of crabgrass when treated in the two leaf stage.

*Example 113*

The following wettable powder is applicable to the low melting solids described in the examples as well as all the high melting solid compounds of this invention.

| | Percent |
|---|---|
| Carbanilic acid, 2-bromocyclohexyl ester | 25.00 |
| Alkyl naphthalene sulfonic acid, Na salt | 1.00 |
| Low viscosity methyl cellulose | 0.25 |
| Attapulgite clay | 73.75 |

The above components are blended and micropulverized until homogeneous and then reblended.

The formulation described above is applied pre-emergence at the rate of four pounds active ingredient per acre in 100 gallons of water for the control of growth of crabgrass in an established bluegrass-fescue lawn. Excellent retardation of crabgrass is obtained without noticeable damage to the desirable turf grasses.

*Example 114*

*Granular formulation.*—The following granular formulation has general application to the cis(2-chlorocyclohexyl)ester of carbanilic acid used in this invention.

| | Percent |
|---|---|
| Carbanilic acid, cis(2-chlorocyclohexyl)ester | 2 |
| 15–30 mesh attaclay granules | 98 |

The active material can be applied to the attaclay granules in several ways. (1) The active material can be dissolved in a volatile solvent such as acetone and sprayed on the tumbling granules, or (2) wettable powder containing the active material can be distributed on the surface of the granules. By moistening with water or a mixture of water and ethylene glycol dusting off is prevented. In other granular formulation, if the melting point of the active ingredient is below about 99° C., the active ingredient can be melted and sprayed over a tumbling mass of preformed clay, vermiculite or similar granules.

This granular formulation is applied pre-emergence with a granule spreader at the rate of six pounds of active ingredient per acre for the control of growth of crabgrass in an established bluegrass-meadow fescue lawn. The crabgrass emerges from the soil but fails to grow. The established lawn grasses show slight retardation with no objectionable injury.

*Examples 115–166*

The following compounds are substituted one at a time for the carbanilic acid, cis(2-chlorocyclohexyl) ester in Example 114 in like amounts by weight and are formulated in like manner. These compounds are applied pre-emergence at the rate of ten pounds per acre for the control of crabgrass and foxtail in parking lots. Excellent control is obtained.

Ex.
115. carbanilic acid, trans, cis-2-chloro-1-methylcyclopentyl ester
116. carbanilic acid, trans, cis-2-chloro-2-methylcyclopentyl ester
117. carbanilic acid, trans, cis-2-chloro-5-methylcyclopentyl ester
118. 3-methylcarbanilic acid, 2-chlorocyclopentyl ester
119. carbanilic acid, 1-chloro-2-methylcyclopentylmethyl ester
120. 3-methylcarbanilic acid, 1-bromocyclopentylmethyl ester
121. carbanilic acid, 1-chlorocyclopentylmethyl ester
122. carbanilic acid, trans-2-chlorocyclohexyl ester
123. 3-methylcarbanilic acid, 4-chlorocyclohexyl ester
124. carbanilic acid, 2-bromocyclohexyl ester
125. carbanilic acid, 2-chlorocyclohexylmethyl ester
126. 3-methylcarbanilic acid, 2-chlorocyclohexyl ester
127. carbanilic acid, 2-chloro-5-methylcyclohexyl ester
128. carbanilic acid, 4-bromocyclohexyl ester
129. 3-methylcarbanilic acid, 2-iodo-1-methylcyclohexyl ester
130. carbanilic acid, 2-chloro-1-methylcyclohexyl ester
131. 3-methylcarbanilic acid, 2-bromo-1-methylcyclohexyl ester
132. carbanilic acid, 2-chloro-5-methylcyclohexyl ester
133. 3-methylcarbanilic acid, trans-2-iodocyclohexyl ester
134. 3-methylcarbanilic acid, trans-2-bromocyclohexyl ester
135. carbanilic acid, cis-2-chloro-2-methylcyclohexyl ester
136. 3-methylcarbanilic acid, 2-bromocyclohexyl ester
137. carbanilic acid, 2-chlorocycloheptyl ester
138. 3-methylcarbanilic acid, 2-bromocyclooctyl ester
139. carbanilic acid, 2-chloro-6-methylcyclohexyl ester
140. 3-methylcarbanilic acid, 2-chloro-4-methylcyclohexyl ester
141. carbanilic acid, 2-chloro-3-methylcyclohexyl ester
142. 3-methylcarbanilic acid, 2,3-dibromocyclohexyl ester
143. carbanilic acid, (dl-1-chloro-2-methylcyclohexylmethyl)ester 144. carbanilic acid, 2-chlorocyclohexylmethyl ester
145. 3-methylcarbanilic acid, 1,2-dibromocyclohexylmethyl ester
146. carbanilic acid, 1-chlorocyclohexylmethyl ester
147. 3-methylcarbanilic acid, 1-bromocyclohexylmethyl ester
148. carbanilic acid, 2-chlorocycloheptyl ester
149. 3-methylcarbanilic acid, cis-2-chloro-5-methylcycloheptyl ester
150. carbanilic acid, cis-1-chloro-2-methylcycloheptyl ester
151. 3-methylcarbanilic acid, cis-2-chloro-1-methylcycloheptyl ester
152. carbanilic acid, trans-2-bromocycloheptyl ester
153. 3-methylcarbanilic acid, trans-2-iodocycloheptyl ester
154. carbanilic acid, 2-chlorocyclooctyl ester
155. carbanilic acid, cis-2-bromocyclooctyl,
156. carbanilic acid, trans-2-bromocyclooctyl ester
157. 3-methylcarbanilic acid, trans-4-bromocyclooctyl ester
158. carbanilic acid, 5-chloro-2-norbornyl ester
159. carbanilic acid, 5-bromo-2-norbornyl ester
160. carbanilic acid, 5,6-difluoro-2-norbornyl ester
161. carbanilic acid, 5,6-dibromo-2-norbornyl ester
162. carbanilic acid, 6-chloro-2-norbornyl ester
163. carbanilic acid, 2(5-chloro-2-norbornylmethyl)ester
164. carbanilic acid, 2(5-bromo-2-norbornylmethyl)ester
165. carbanilic acid, 2(5,6-dicholor-2-norbornylmethyl) ester
166. carbanilic acid, 2-chlorocyclopentyl ester

*Example 167*

*Pellet formulation.*—The following pellet formulation is applicable to any halo-substituted cycloalkyl or bicycloalkyl carbanilic acid used in this invention.

| | Percent |
|---|---|
| 3-methylcarbanilic acid, 5-chloro-2-norbornyl ester | 11 |
| Anhydrous sodium sulfate | 10 |
| Mississippi sub-bentonite | 33 |
| Kaolin | 33 |
| Lignin sodium sulfonate | 13 |

These ingredients are mixed and blended by micropulverizing. Approximately 18% water as calculated on a wet basis is added to the formulation and thoroughly mixed. The resulting product is extruded into pellets through a screw type extruder fitted with a die containing orifices of 3/32 inch. The extruded strands are conveniently cut into small pellets as they come out of the extruder die. The pellets are air dried. After drying the pellets can be easily handled and applied as such. However, they readily soften and disintegrate when mildly agitated in water and can also be applied in water rather than as the pellets.

*Example 168*

The following wettable powder formulation is prepared

| | Percent |
|---|---|
| Carbanilic acid, 2-chlorocyclohexyl ester | 52.6 |
| Pikes Peak clay | 44.4 |
| Sodium dioctyl sulfosuccinate | 1.5 |
| Sodium lignin sulfonate | 1.5 |

The above components are blended and micropulverized until homogeneous and then reblended.

The formulation described above is applied preemergence at the rate of four pounds of active ingredient per acre in 100 gallons of water for the control of crabgrass growth in an established bluegrass-fescue lawn. Excellent retardation of crabgrass is obtained, without noticeable damage to the desirable turf grasses.

This formulation is also used pre-emergence at six pounds of active ingredient in 80 gallons of water for growth retardation of crabgrass without injury to a new seeding of Kentucky bluegrass. The crabgrass barely emerges and fails to make further growth, whereas the bluegrass grows vigorously and develops into a healthy stand of turf.

*Examples 169–181*

The following compounds are substituted one at a time for the carbanilic acid, 2-chlorocyclohexyl ester in Example 168 in like amount by weight and are formulated and applied in like manner. Like results are obtained Ex.
169. 2-methylcarbanilic acid, 2-chlorocyclohexyl ester
170. 2-methylcarbanilic acid, 3-chlorocyclohexyl ester
171. 4-methylcarbanilic acid, 2-chlorocyclohexyl ester
172. 4-methylcarbanilic acid, 3-chlorocyclohexyl ester
173. 2-methylcarbanilic acid, 2-bromocyclohexyl ester
174. o-fluorocarbanilic acid, 2-methylcyclohexyl ester
175. o-fluorocarbanilic acid, 3-methylcyclohexyl ester
176. o-fluorocarbanilic acid, 2-chlorocyclohexyl ester
177. o-fluorocarbanilic acid, 2-bromocyclohexyl ester
178. o-fluorocarbanilic acid, cycloheptyl ester
179. o-fluorocarbanilic acid, cyclooctyl ester
180. o-fluorocarbanilic acid, cyclohexylmethyl ester
181. o-fluorocarbanilic acid, norbornyl ester

*Example 182*

The following granular formulation can be used. A wettable powder is first prepared by micropulverizing the following ingredients

| | Percent |
|---|---|
| Carbanilic acid, 2-methylcyclohexanol ester (technical grade) | 52.6 |
| Attapulgite clay | 32.4 |
| Sodium alkylnaphthalene sulfonate | 3.0 |
| Fine silica | 10.0 |
| Sodium lignosulfonate | 2.0 |

The wettable powder is distributed over the surface of #4 vermiculite by tumbling together. To make the combination more adherent the mix is sprayed with a mixture of propylene glycol and water. The final ratio of ingredients is as follows

| | Percent |
|---|---|
| 50% active wettable powder (as described above) | 10.0 |
| Propylene glycol | 5.0 |
| Vermiculite (Zonolite) #4 agricultural grade | 80.0 |
| Water | 5.0 |

In a modification of the above formulation the propylene glycol can be replaced by a mixture of the sodium sulfates of mixed long chain alcohol fatty acid esters and diethylene glycol abietate in a ratio between 1:10 and 10:1 by weight.

The granular formulation described above has utility as a pre-emergence treatment for retarding the growth of crabgrass in an established Kentucky bluegrass-creeping red fescue lawn. The material is applied with a granule spreader at the rate of eight pounds of active ingredient per acre prior to the germination of crabgrass. Such excellent retardation of crabgrass is obtained that it presents no competition to the established lawn.

*Example 183*

The following granular formulation can be used. A wettable powder is first prepared by micropulverizing the following ingredients

| | Percent |
|---|---|
| Carbanilic acid, 2-chlorocyclohexanol ester (technical grade) | 52.6 |
| Attapulgite | 32.4 |
| Sodium alkylnaphthalene sulfonate | 3.0 |
| Fine silica | 10.0 |
| Sodium lignosulfonate | 2.0 |

The wettable powder is distributed over the surface of #4 vermiculite by tumbling together. To make the combination more adherent the mix is sprayed with a mixture of propylene glycol and water. The final ratio of ingredients is as follows

| | Percent |
|---|---|
| 50% active wettable powder (as described above) | 10.0 |
| Propylene glycol | 5.0 |
| Vermiculite (Zonolite) #4 agricultural grade | 80.0 |
| Water | 5.0 |

In a modification of the above formulation the propylene glycol can be replaced by a mixture of the sodium sulfates of mixed long chain alcohol fatty acid esters and diethylene glycol abietate in a ratio between 1:10 and 10:1 by weight.

The granular formulation described above has utility as a pre-emergence treatment for retarding the growth of crabgrass in an established Kentucky bluegrass-creeping red fescue lawn. The material is applied with a granule spreader at the rate of eight pounds of active ingredient per acre prior to the germination of crabgrass. Such excellent retardation of crabgrass is obtained that it presents no competition to the established lawn.

Example 184

The following wettable powder can be diluted with water and applied as a post-emergence spray or it may be made up as a tank mix in conjunction with 0.2–5 parts of trimethyl nonyl polyethylene glycol ether per part of active ingredient:

| | Percent |
|---|---|
| Carbanilic acid, cyclohexyl ester | 84 |
| Montmorillonite clay | 13 |
| Dioctyl sodiumsulfosuccinate | 2 |
| Partially desulfonated sodium lignin sulfonate | 1 |

This wettable powder formulation is sprayed at the rate of twelve pounds of active ingredient as a pre-emergence spray to crabgrass and foxtail in a newly-seeded lawn.

Excellent retardation of both weedy grasses is obtained. Upon examination of the weeds, severe retardation of the root system is noted. There is not noticeable effect on Kentucky bluegrass, creeping red fescue and colonial bentgrass turfs.

Example 185

The following components are blended and micro-pulverized until homogeneous and then reblended:

| | Percent |
|---|---|
| Carbanilic acid, cyclohexyl ester | 25.00 |
| Alkyl naphthalene sulfonic acid, Na salt | 1.00 |
| Low viscosity methyl cellulose | 0.25 |
| Attapulgite clay | 73.75 |

The wettable powder formulation described above is applied pre-emergence at the rate of sixteen pounds of active ingredient per acre in 100 gallons of water for the control of growth of crabgrass in an established bluegrass-fescue lawn. Excellent retardation of crabgrass is obtained without noticeable damage to the desirable turf grasses.

Example 186

The following wettable powder formulation is prepared and applied in the manner of the formulation of Example 184.

| | Percent |
|---|---|
| Carbanilic acid, cyclohexyl ester (technical grade) | 52.6 |
| Attaclay | 33.0 |
| "Alkanol" B (sodium alkylnaphthalene sulfonate) | 4.0 |
| Hi Sil 233 | 10.0 |
| Methocal 15 (low viscosity methyl cellulose) | 0.4 |

Example 187

The following granular composition is formulated:

| | Percent |
|---|---|
| Carbanilic acid, 2-methylcyclohexyl ester | 2 |
| 15–30 mesh attaclay granules | 98 |

The active material can be applied to the attaclay granules in several ways. (1) The active material may be dissolved in a volatile solvent such as acetone and sprayed on the tumbling granules, or (2) wettable powder containing the active material may be distributed on the surface of the granules. By moistening with water or a mixture of water and ethylene glycol dusting off is prevented. In other granular formulation, if the melting point of the active ingredient is below about 99° C., the active ingredient can be melted and sprayed over a tumbling mass of preferred clay-, vermiculite-, or similar granules.

The above described granular formulation is applied pre-emergence with a granule spreader at the rate of 1 to 3 pounds of active ingredient per acre to an area newly-seeded to a Kentucky bluegrass-red fescue mixture. The desirable turf grass species develop a normal stand of grass but nimblewill, *Muhlenbergia schreberi*, sprouting from seed fails to develop beyond the seedling stage.

Example 188

| | Percent |
|---|---|
| o-Fluorocarbanilic acid, 2-methylcyclohexyl ester | 25.00 |
| Hydrated attapulgite | 1.75 |
| $Na_2HPO_4$ | 0.80 |
| Sodium pentachlorophenate | 0.60 |
| Sodium lignin sulfonate | 15.00 |
| Water | 56.85 |

The above composition is mixed with an equal volume of Ottawa sand of 20–30 mesh and sandmilled for 45 minutes to yield a stable aqueous suspension which may be diluted with water for spray application.

The above described sand ground formulation is added at the rate of 15 pounds of active compound per 40 gallons of water to a tank filled with water. Ten pounds of O-(2,4-dichlorophenyl)-O-methyl isopropylphosphoramidothioate are further added to each 40 gallons of mixture, and thorough agitation is applied. This spray liquid is applied at the rate of 40 gallons per acre to a nimblewill infested lawn comprising Merion bluegress and Kentucky 31 fescue. The treatment results in excellent control of a young stand of nimblewill without causing injury to the turf grasses.

Example 189

The following wettable powder is suitable for any of the compounds described which melt above 90° C.

| | Percent |
|---|---|
| Carbanilic acid, 2-chlorocyclohexyl ester | 50 |
| Diatomaceous silica | 48 |
| Coconut acid ester of sodium isethionate | 1 |
| Sodium lauryl sulfate | 1 |

The ingredients are blended and micropulverized to pass a 60 mesh screen.

This wettable powder formulation is added at the rate of 1 pound per gallon of water to a knapsack sprayer filled with water. After thorough agitating, the resultant suspension is applied as a "spot treatment" at the rate of 60 pounds of substituted carbanilate compound per acre to patches of nimblewill growing from rhizomes in a Pennlawn fescue lawn. The nimblewill initially becomes slightly necrotic and its further growth is arrested. The weed eventually dies and the turf species fill in the areas which originally had been infested.

Example 190

The following emulsifiable oil can be extended with either oil or water:

| | Percent |
|---|---|
| Carbanilic acid, 2-chlorocyclooctyl ester | 20 |
| A blend of polyoxyethylene ethers and oil soluble sulfonates | 5 |
| Alkylated naphthalene (principally α-methyl naphthalene) | 75 |

The above components are blended and agitated until a homogeneous mixture is obtained.

The above-described formulation is emulsified with water in such a proportion that 60 gallons of emulsion contains 6 pounds of the active carbanilic acid ester. The resultant liquid is applied at a volume of 60 gallons per acre to an established mixed Kentucky bluegrass and creeping red fescue lawn. Nimblewill seeds present in the soil germinate but fail to develop beyond the seedling stage and ultimately succumb to the chemical treatment. The desirable turf grasses exhibit excellent growth.

*Example 191*

The following pellet formulation is used:

| | Percent |
|---|---|
| Carbanilic acid, cycloheptyl ester | 11 |
| Anhydrous sodium sulfate | 10 |
| Mississippi sub-bentonite | 33 |
| Kaolin | 33 |
| Lignin sodium sulfonate | 13 |

These ingredients are mixed and blended by micropulverizing. Approximately 18% water as calculated on a wet basis is added to the formulation and thoroughly mixed. The resulting product is extruded into pellets through a screw type extruder fitted with a die containing orifices of 3/32 inch. The extruded strands are conveniently dropped into small pellets as they come out of the extruder die. The pellets are air dried. After drying the pellets can be easily handled and applied as such. However, they readily soften and disintegrate when mildly agitated in water and can also be applied in water rather than as the pellets.

The above-described pellets are evenly distributed by hand at a rate of 40 pounds of active carbanilic acid ester per acre to particular areas of a bentgrass lawn which have been overgrown by nimblewill. The nimblewill soon fails to make further growth and ultimately dies, enabling the bentgrass to grow normally.

*Example 192*

A dust formulation is prepared and applied as follows:

| | Percent |
|---|---|
| Carbanilic acid, cyclooctyl ester | 5 |
| Talc | 95 |

The ingredients are mixed and micropulverized to a state of subdivision in which most of the individual particles are below 50 microns in size.

The above dust formulation is dispersed from a handheld dust canister and applied as a "spot treatment" to localize lawn areas infested with nimblewill vegetation. The rate of application is 40 to 50 pounds of active carbanilic acid ester per acre. From the time of treatment, the growth of nimblewill is arrested, resulting in ultimate kill of the noxious weed. The bare areas are closed in by the surrounding turf grass species.

*Example 193*

The following wettable powder formulation is prepared:

| | Percent |
|---|---|
| Carbanilic acid, 2-chlorocyclohexyl ester (95% technical product) | 52.6 |
| Sodium alkylnaphthalenesulfonate | 3.0 |
| Partially desulfonated sodium lignin sulfonate | 2.0 |
| Synthetic fine silica | 10.0 |
| Attapulgite clay | 32.4 |

The above components are blended, hammermilled until the average particle size is substantially less than 50 microns in diameter and then reblended.

Eight pounds per acre of active ingredient suspended in 80 gallons of water is applied in the spring to an area on which it is desired to establish a perennial grass turf. This is an area around a newly completed house on which Kentucky bluegrass is seeded immediately prior to treatment.

Both the bluegrass and annual weed grass, such as crabgrass, barnyardgrass and foxtail emerge. However, periodic observation of the area reveals that the bluegrass continues to grow while the weed grasses are severely retarded. Good turf management practices of fertilizing and irrigating are followed. By fall, a dense bluegrass turf has become established.

*Example 194*

The following 10-5-5 fertilizer mixture is prepared:

| | Percent |
|---|---|
| Diammonium phosphate | 10.9 |
| Ammonium sulfate | 36.5 |
| Tankage (4% N) | 15.0 |
| Potassium chloride | 8.4 |
| Carbanilic acid, 2-methylcyclohexyl ester | 0.7 |
| Limestone | 28.5 |

At a site near Newark, Del., it is desired to establish a turf in an area of mediocre mixed bluegrass and fescue containing bare spots of from 6 inches to 3 feet in diameter. The bare spots result from infestation by crabgrass and other annual weed grasses in previous years. On a bright morning in early April, the fertilizer mixture above is applied to the entire area, bare spots as well as established portions of the area, using a fertilizer spreader adjusted to deliver about 20 pounds of the mixture per 1000 square feet, which is equivalent to about 6 pounds of carbanilic acid, 2-methylcyclohexyl ester per acre. An adjacent area is fertilized at an equivalent rate with a similar fertilizer mixture not containing the carbanilate.

Rain in the afternoon halts further work until the following day, when the bare areas are scarified and hand seeded with a mixture of Kentucky bluegrass and Pennlawn fescue.

In July, the area treated with carbanilic acid, 2-methylcyclohexyl ester contains a lush stand of perennial grasses. The newly seeded grass has established itself in the areas which were previously bare and is nearly as dense as the neighboring turf which had existed at the time of seeding. The adjacent area, where no carbanilate had been applied, contains a mixed population of bluegrass, fescue and mixed annual weed grasses, including crabgrass, foxtail, barnyardgrass and nimblewill. The weed grasses are so prevalent and vigorous in these newly seeded areas that the seeding effort was of little avail. Competition from the faster starting weed grasses results in the death of most of the bluegrass and fescue seedlings. The fertilizer, apparently, only serves to make the weed grasses more vigorous.

After frost in October, a uniform green carpet is seen in the area where carbanilic acid, 2-methylcyclohexyl ester has been applied, while the adjacent area which has not been treated with this carbanilate presents a splotchy green and brown, since the frost has killed the annual weed grasses.

*Example 195*

In an area nearby and similar to that of Example 194 similar rates of the same fertilizer, carbanilic acid, 2-methylcyclohexyl mixture are applied, but the bare spots are not seeded.

In July the larger bare spots are still obvious, but are becoming smaller due to the desirable grass spreading into them. The spreading of these desirable grasses is not suppressed by annual weed grasses.

By October, all but the very largest bare areas are filled by the spreading fescue and bluegrass.

In April of the following year, the area is again treated with the fertilizer: carbanilate mixture and by the following fall, a dense, uniform bluegrass: fescue turf is established, completely covering the bare patches which existed only nineteen months before.

The invention claimed is:

1. Method for retarding annual grass weeds and establishing a perennial grass turf in an area by applying to the area before annual grass weed seeds have developed beyond the three-leaf stage, one-half to twenty pounds per acre of a compound of the formula:

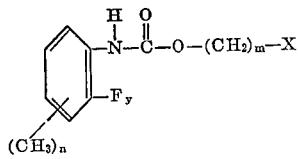

wherein

X is selected from the group consisting of monomethyl-, dimethyl-, monohalo-, dihalo-, and monohalomonomethyl-saturated cycloalkyl where each cycloalkyl has 5 through 8 carbon atoms, monomethyl-, dimethyl-, monohalo-, dihalo-, and monohalomonomethyl-saturated bicycloalkyl where each bicycloalkyl has 7 through 8 carbon atoms, saturated cyclohexyl, saturated cycloheptyl, saturated cyclooctyl, saturated bicycloheptyl, saturated bicyclooctyl, monoethyl- and diethyl-saturated cyclohexyl, with the limitation that when X is cycloalkyl of 5, 7 and 8 carbon atoms and bicycloalkyl of 7 through 8 carbon atoms, $(CH_3)_n$ must be in the meta position; and m, n and y are each separately selected from the group consisting of 0 and 1.

2. Method according to claim 1 wherein the grass turf is bluegrass.

3. Method according to claim 1 wherein the grass turf is fescue.

4. Method according to claim 1 wherein the grass turf is bentgrass.

5. Method according to claim 1 wherein the compound applied is carbanilic acid, 2-methylcyclohexyl ester.

6. Method according to claim 1 wherein the compound applied is carbanilic acid, 3-methylcyclohexyl ester.

7. Method according to claim 1 wherein the compound applied is carbanilic acid, 2-chlorocyclohexyl ester.

8. Method according to claim 1 wherein the compound applied is carbanilic acid, cycloheptyl ester.

9. Method according to claim 1 wherein the compound applied is carbanilic acid, cyclohexyl ester.

10. Method according to claim 1 wherein the compound applied is o-fluorocarbanilic acid, 2-methylcyclohexyl ester.

11. Method according to claim 1 wherein the compound applied is o-fluorocarbanilic acid, 3-methylcyclohexyl ester.

12. Method according to claim 1 wherein the compound applied is carbanilic acid, 2,4-dimethylcyclohexyl ester.

13. Method according to claim 1 wherein the compound applied is 3-methylcarbanilic acid, 2-methylcyclohexyl ester.

14. Method according to claim 1 wherein the compound applied is carbanilic acid, cyclohexylmethyl ester.

15. Method according to claim 1 wherein the compound applied is carbanilic acid, 2-bromocyclohexyl ester.

16. Method according to claim 1 wherein the compound applied is carbanilic acid, cyclooctyl ester.

17. Method according to claim 1 wherein the compound applied is carbanilic acid, norbornyl ester.

References Cited

UNITED STATES PATENTS 2,812,247  11/1957  Gysin et al. _____ 71—2.3

OTHER REFERENCES

George et al.: Agricultural and Food Chemistry, vol. 2, #7, Mar. 31, 1954, pp. 356–363.

LEWIS GOTTS, *Primary Examiner.*

JAMES O. THOMAS, JR., *Assistant Examiner.*